US007747480B1

(12) United States Patent
Agresta et al.

(10) Patent No.: US 7,747,480 B1
(45) Date of Patent: Jun. 29, 2010

(54) ASSET REPOSITORY HUB

(75) Inventors: Ronald Jeffrey Agresta, Raleigh, NC (US); Scott Aron Gidley, Cary, NC (US); Brian Carl Rineer, Apex, NC (US); Alexander A. Novozhilov, Wake Forest, NC (US)

(73) Assignee: SAS Institute Inc., Cary, NC (US)

( * ) Notice: Subject to any disclaimer, the term of this patent is extended or adjusted under 35 U.S.C. 154(b) by 249 days.

(21) Appl. No.: 11/692,433

(22) Filed: Mar. 28, 2007

Related U.S. Application Data

(60) Provisional application No. 60/788,403, filed on Mar. 31, 2006.

(51) Int. Cl.
- *G06Q 10/00* (2006.01)
- *G06F 15/16* (2006.01)
- *G06F 15/177* (2006.01)
- *G06F 7/00* (2006.01)
- *G05B 15/00* (2006.01)

(52) U.S. Cl. .............................. 705/28; 700/1; 709/206; 709/220; 707/600

(58) Field of Classification Search ............... 705/1–79; 707/100

See application file for complete search history.

(56) References Cited

U.S. PATENT DOCUMENTS

| | | | | |
|---|---|---|---|---|
| 2003/0014537 A1* | 1/2003 | Kupiec et al. | ................ | 709/238 |
| 2003/0101223 A1* | 5/2003 | Pace et al. | ................... | 709/206 |
| 2003/0154266 A1* | 8/2003 | Bobick et al. | ................ | 709/223 |
| 2003/0177481 A1* | 9/2003 | Amaru et al. | ................ | 717/148 |
| 2003/0204592 A1* | 10/2003 | Crouse-Kemp et al. | ..... | 709/225 |
| 2004/0010571 A1* | 1/2004 | Hutchinson et al. | ......... | 709/220 |
| 2004/0128374 A1* | 7/2004 | Hodges et al. | .............. | 709/223 |
| 2004/0162887 A1* | 8/2004 | Dillon et al. | ................ | 709/217 |

OTHER PUBLICATIONS

Database and Expert Systems Application by Shahri et al. ISBN 978-3-540-22936-0 dated 2004.*

* cited by examiner

*Primary Examiner*—Andrew J. Fischer
*Assistant Examiner*—Murali K Dega
(74) *Attorney, Agent, or Firm*—Jones Day

(57) ABSTRACT

Systems and methods for managing data assets in an enterprise computing environment are provided. Data assets associated with a plurality of source systems operating within the enterprise computing environment may be registered with an asset repository hub. The asset repository hub receives a registration request from a source system for a particular data asset and determines whether the data asset is unique within the enterprise computing environment. If the data asset is unique, then the data asset is stored at the asset repository hub and a unique enterprise identifier is associated with the data asset. In determining whether the asset is unique, the asset repository hub may cleanse the data asset against a set of business rules; generate a plurality of match codes that describe the content of the data asset; and cluster the generated match codes against clusters of previously generated match codes. Also provided herein is a mechanism for searching and locating data assets stored within the enterprise computing environment by submitting queries to the asset repository hub.

23 Claims, 8 Drawing Sheets

| | 118 | 120 | 122 |
|---|---|---|---|
| INPUT | Ronald J Agresta | The DataFlux Corporation | Mr. Ron Agresta |
| PARSE | [Ronald] [J] [Agresta] | [The DataFlux Corporation] | [Mr.][Ron][Agresta] |
| TOKEN SELECTION | [Ronald] [Agresta] | [The DataFlux Corporation] | [Ron][Agresta] |
| NORMALIZATION | [RONALD] [AGRESTA] | [THE DATAFLUX CORPORATION] | [RON][AGRESTA] |
| NOISE REMOVAL | [RON] [AGRESTA] | [DATAFLUX] | [RON][AGRESTA] |
| STANDARDIZATION | [RNJ [AGRESTJ | [DATAFLUX] | [RN] [AGRST] |
| PHONETICS | [RNJ [AGRST] | [DTFLX] | [RN] [AGRST] |
| MATCH CODE | 8FY4~&$$$YB$$$$ | 8~GwX$$$$$$$$$ | 8FY4~&$$$YB$$$$ |

112

| | |
|---|---|
| INPUT | 10" S.S. Sheet Metal Screw |
| PARSE | [10"] [S.S.] [Sheet Metal] [Screw] |
| TOKEN SELECTION | [10"] [S.S.] [Screw] |
| NORMALIZATION | [10"] [SS] [SCREW] |
| NOISE REMOVAL | [10"] [SS] [SCREW] |
| STANDARDIZATION | [10] [SS] [SCREW] |
| PHONETICS | [10SSSCRW] |
| MATCH CODE | GHA&@SDS$$$$$$ |

114

| | |
|---|---|
| INPUT | 10-inch Stainless Steel Screw |
| PARSE | [10-inch] [Stainless Steel] [Screw] |
| TOKEN SELECTION | [10-inch] [Stainless Steel] [Screw] |
| NORMALIZATION | [10-INCH] [STAINLESS STEEL] [SCREW] |
| NOISE REMOVAL | [10-INCH] [STAINLESS STEEL] [SCREW] |
| STANDARDIZATION | [10] [SS] [SCREW] |
| PHONETICS | [10SSSCRW] |
| MATCH CODE | GHA&@SDS$$$$$$ |

116

Fig. 4 ered with the data asset. In determining whether the asset is unique, the asset repository hub may cleanse the data asset against a set of business rules; generate a plurality of match codes that describe the content of the data asset; and cluster the generated match codes against clusters of previously generated match codes. Also provided herein is a mechanism for searching and locating data assets stored within the enterprise computing environment by submitting queries to the asset repository hub.

ASSET REPOSITORY HUB

CROSS REFERENCE TO RELATED APPLICATIONS

This patent application claims priority from and is related to U.S. Provisional Application Ser. No. 60/788,403, filed March 31, 2006, titled "Asset Repository Hub." The entirety of this prior application is hereby incorporated into this patent application be reference.

BACKGROUND

As modern businesses have become more reliant on information systems to conduct their affairs, it has become typical for such companies to employ distributed enterprise computing environments having many different databases and many different enterprise applications for managing the day-to-day business activities of the company. These varying enterprise applications may include transactional databases, CRM applications, ERP applications, data warehouse and the like, and oftentimes these applications are distributed across local and wide area network connections and may operate on many distinct server systems at numerous geographic locations. Moreover, each of these varying applications may include a separate database of business-related data, much of which may overlap, at least in part, with data maintained in other databases maintained by other enterprise applications.

The kinds of data that these systems manage can vary from customer data, to inventory data, to financial transaction data, etc. In addition, each of these different kinds of data can be made up of any number of unique data assets that have particular attributes specific to a given subject area. For example, a customer is a specific type of data asset. It can be differentiated from a product data asset in that they both have different attributes or rules for use. The former may contain address or other contact information of the customer, while the latter may contain size, weight and quantity information of a particular product.

As noted above, oftentimes the data assets produced and processed by these various and numerous enterprise applications are segregated within each application, server, or sub-network of the enterprise computing environment such that other applications are not aware of the same data assets maintained by a particular application. Unfortunately, in this scenario, two different server systems executing two different enterprise applications may be aware of the same customer, but they may store substantially differing accounts of the attributes or activities of that particular individual. For example, one system may store only the name, address and social security number of a particular customer, whereas the second system may store this same information and may also store information regarding products recently purchased by the customer. In addition to this disparity in the types of data attributes being stored, each system may also store the data attributes in slightly differing formats.

The scenario described above, which is typical in most enterprise-wide computing environments that employ multiple, separate applications and databases, almost guarantees that the overall computing system includes large amounts of non-standard, redundant, and sometimes confusing data regarding the customers, products, etc., that are critical to operating the business. Because of this, it can be very difficult to get an accurate view of the business activities of the enterprise, such as, for example, obtaining a clear and complete picture of particular customer activities of the business.

SUMMARY

Systems and methods for managing data assets in an enterprise computing environment are provided. Data assets associated with a plurality of source systems operating within the enterprise computing environment may be registered with an asset repository hub. The asset repository hub receives a registration request from a source system for a particular data asset and determines whether the data asset is unique within the enterprise computing environment. If the data asset is unique, then the data asset is stored at the asset repository hub and a unique enterprise identifier is associated with the data asset. In determining whether the asset is unique, the asset repository hub may cleanse the data asset against a set of business rules; generate a plurality of match codes that describe the content of the data asset; and cluster the generated match codes against clusters of previously generated match codes. Also provided herein is a mechanism for searching and locating data assets stored within the enterprise computing environment by submitting queries to the asset repository hub.

BRIEF DESCRIPTION OF THE DRAWINGS

FIG. 4 is a diagram showing several examples of generating match codes according to the methodology of FIG. 3;

DETAILED DESCRIPTION

Figure 1:
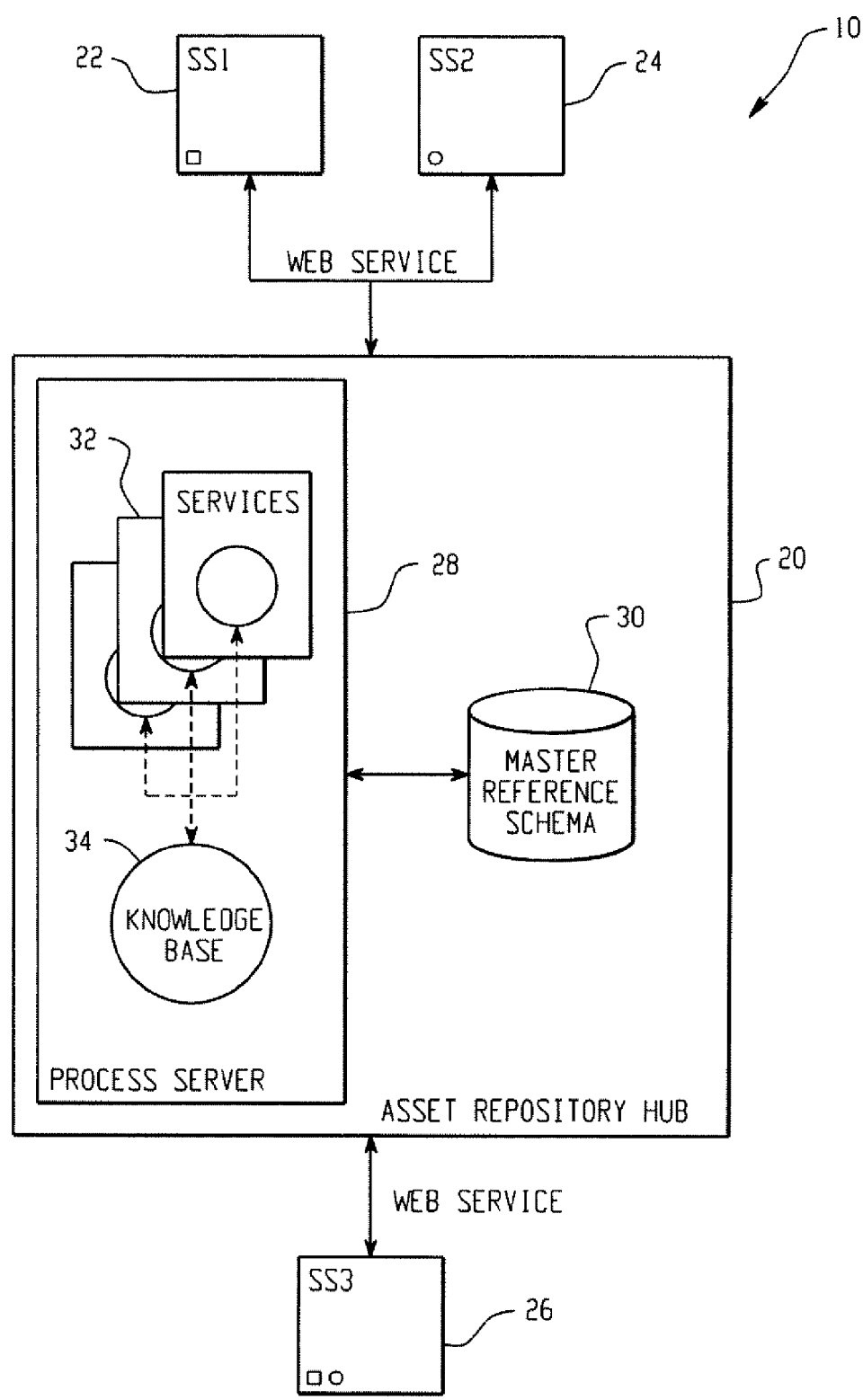
FIG. 1 is an example system including an asset repository hub.

FIG. 1 is an example system 10 including an asset repository hub 20. The asset repository hub 20 in this example system includes a process server 28 having a knowledge base 34 and a plurality of services 32, and a master reference schema 30. Within this system 10, the asset repository hub 20 may communicate with a plurality of enterprise application source systems 22, 24, 26, through, for example, web service connections.

Conceptually, the asset repository hub 20 provides a mechanism by which similar, but disparate data assets of any type and across any number of source systems can be linked, standardized and stored in such a way to facilitate: (1) creation of consolidated views of data assets across the enterprise; (2) search functionality for locating similar assets across the various source systems; (3) creation of an "enterprise ID" for each unique enterprise data asset so that such assets can be located, tracked and maintained; and (4) creation of a single "enterprise standard" for each unique enterprise data asset so that the enterprise can maintain the most complete view of any particular asset. This mechanism, which is described in more detail herein, is a computer-implemented system and method that includes an asset repository hub where unique enterprise data assets are stored. The system and method provide functionality for cleansing, matching and clustering data assets so as to maintain a "best version" or "enterprise standard" of an asset in the asset repository.

The asset repository hub 20 provides additional functionality that enables any number of enterprise application source systems 22, 24, 26 to register data assets they own or manage with the hub 20. The asset repository hub 20 then manages the relationships, linkages, data presentation standards and contributing source system locations of all the data assets that are registered with the system 10. A registration process makes the asset repository hub 20 aware of a new enterprise data asset and its location by source system. After an asset has been registered, the asset repository hub 20 provides additional functionality that facilitates to the sharing of that asset's information with other enterprise applications that might be interested in the asset.

In the example system 10 shown in FIG. 1, the asset repository hub 20 includes a process server 28, a knowledge base 34 and a master reference schema 30. The process server 28 is a combination of technologies including a server that operates "services" 32 initiated through, for example, web service calls using XML or WSDL standard calls. These services 32 are data transformation and movement processes that take data about information assets in existing source systems 22, 24, 26 as inputs, where the source systems 22, 24, 26 may be enterprise applications or databases. The services 32 provide the functionality to link and standardize these disparate data sources, assigning unique enterprise asset IDs to sets of data assets that share some commonality. The rules that define the criteria for commonality are stored in the services 32 components. In order to create the "best record" for each processed data asset, the services 32 access the knowledge base 34 for data type-specific algorithms that enable matching and standardization using fuzzy searching and linking processes.

Stored within the knowledge base 34 are the rules needed to match, standardize and otherwise transform enterprise data assets. The knowledge base 34 contains algorithms that are aware of the vagaries of particular types of data. For example, the knowledge base 34 would know that "1 inch stainless steel screw" and "1 SS Screw" are the same asset attribute when working with a product data asset. Likewise, when working with a data asset attribute called "address," the knowledge base 34 would provide the requisite information to the system to know that "100 Main Street" and "100 main st" are matching attributes of two data assets. These are just two examples of the thousands of these types of business rules that may be included in the knowledge base 34. Further information regarding an example implementation of the knowledge base 34 is set forth in US 2004/0123101 A1, titled "Computer-Implemented System and Method for Managing Data Integrity Validation Rules," which is assigned to the assignee of the present application, and which is hereby incorporated by reference into this patent document.

Also included in the example asset repository hub 20 is the master reference schema 30, which is a database specifically designed to facilitate "registering" and retrieval of enterprise data assets. It is constructed in such a way to enable fuzzy matching of data assets. It also allows for the storage of many similar assets that contribute to the one unique asset as determined by the asset repository hub 20. Standardized asset information can be persisted in the master reference schema 30 and can be made available to other source system applications that request it.

Operationally, the example system 10 shown in FIG. 1 may function as follows. Consider two source systems, source system 1 (SS1) 22 and source system 2 (SS2) 24. Both systems contain data that refers to the same unique product in the company's inventory, but the data in the two systems describes the product in slightly different ways. For example, SS1 22 uses many abbreviations to describe the product, and is non-standardized. System SS2 24, on the other hand, has the same information as that stored with SS1 22, but the data is parsed into many different detailed database fields. In addition, the data stored with SS2 24 contains current pricing information while the data in SS1 22 does not.

Source system SS1 22 attempts to register its version of the data asset for the product with the asset repository hub 20 by making a web service call to one of the register services 32 within the process server 28. If the register call is successful, then a new standardized asset, along with information regarding the location of the source system (SS1) from where it came, is then stored in the master reference schema 30. Moreover, the standardized asset is given a unique enterprise asset ID tag.

Subsequently to the registration call by SS1 22, the source system SS2 24 then attempts to register its version of the same data asset that describes the product with the asset repository hub 20. In doing so, SS1 22 makes a web service call to the process server 28 through one of the services components 32. The process server 28 then queries the master reference schema 30 to determine if the same product asset has already been registered with the system. Because SS1 22 previously registered its version of the product asset, the process server 28 determines that there is a very similar, although not identical, asset which is already registered with the system 20. Because a similar asset has already been registered, the asset repository hub 20 does not create a new unique asset in the master reference schema 30, but instead merges one or more of the attributes of the new asset from 552 with the version of the asset that was previously registered with the system. Once again, the system 10 also records in the master reference schema 30 the source system location (SS2) of this new asset. At this point, the asset repository hub 30 has now reconciled information from both source systems (SS1 and SS2) into a single snapshot for the product asset and thus data attributes that were previously only available to one source system (e.g., pricing information) are now available to any system seeking information regarding this product asset.

For example, following the merging of the data attributes from SS1 and SS2, source system 3 (SS3) 26 now accesses the asset repository hub 20 to inquire about the whereabouts and attributes of the very same product in inventory that has just been registered in the preceding steps by SS1 and SS2. SS3 26 only stores limited information about the product asset and wants to know where to find more information about the product. Using the system 20, SS3 makes a web service call to the process server 28 using a search service 32. The process server 28 then queries the master reference schema 30 to determine whether any product assets match the search information provided by SS3 26. In this case, a match is found for the product asset previously registered by SS1 and SS2, and thus, the process server 28 reports back to SS3 26 with the "best record" attributes stored in the asset repository hub 20, along with the location information for SS1 and SS2 where the product attributes are separately stored.

Figure 2:
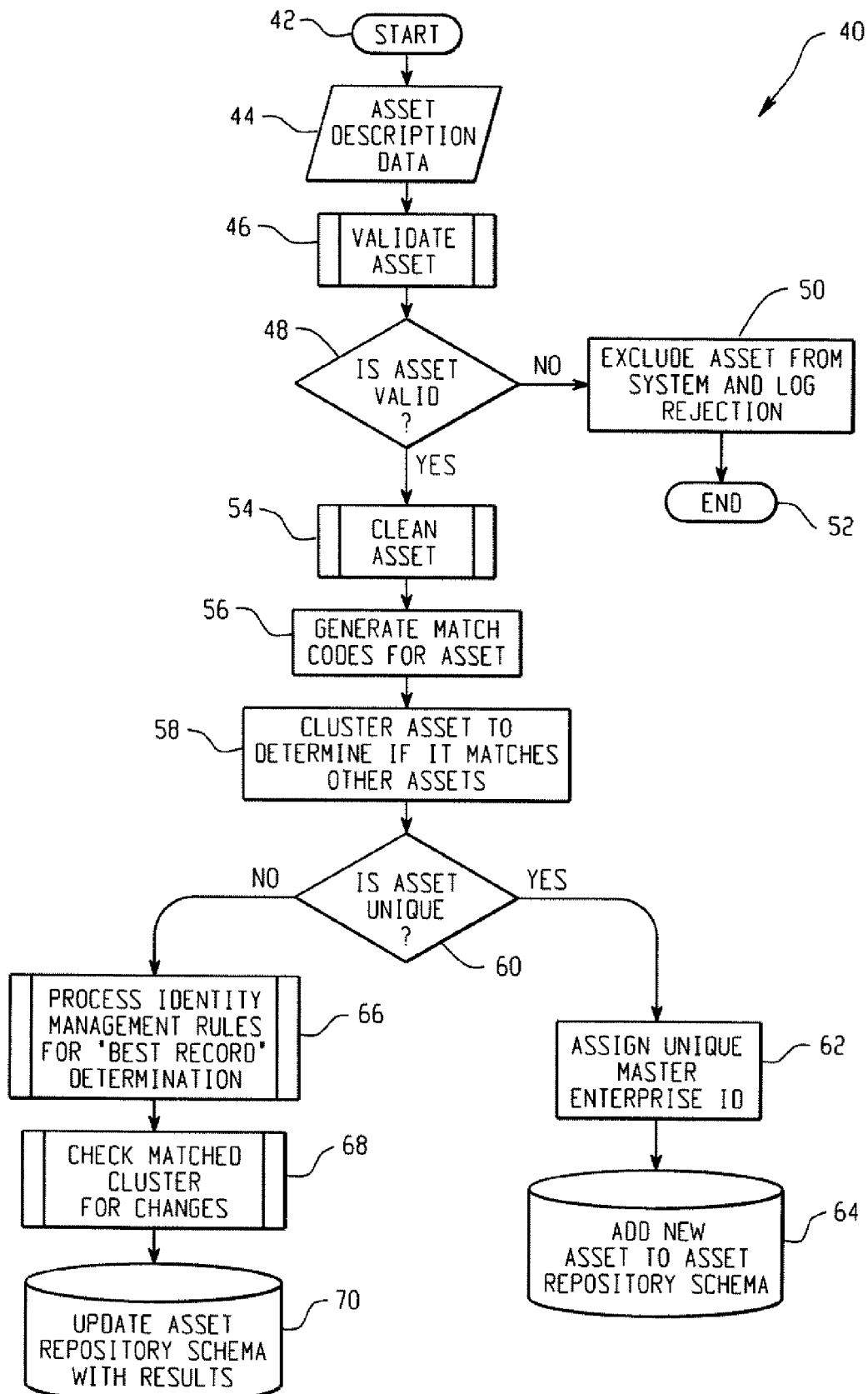
FIG. 2 is a flow diagram depicting an example method of registering an asset with the asset repository hub incorporating cleansing, match code generation and clustering steps.

FIG. 2 is a flow diagram 40 depicting an example method of registering an asset with the asset repository hub 20 incorporating cleansing, match code generation and clustering steps. The method begins at 42, when an enterprise application makes a web service call to the asset repository hub 20, and subsequently passes pertinent data asset information at step 44 to a "register" service 32 that is hosted on the process server 28. This asset description data describes the attributes of the asset as known to the calling application. The data asset information from step 44 is then validated in step 46 against a set of rules specific to the type of data asset being validated. For example, if the asset is a customer data asset that includes phone number data, then one of the validation rules may check to determine if there are at least 7 digits provided. Or, if the asset is a product type asset, then one of the validation rules may check to determine if a product code is included. If the incoming data asset from the enterprise application does not pass the validation rules, as determined at step 48, then the asset is excluded from the system at step 50, and the system logs into memory that the asset was rejected. In this case, the method ends at 52. If, however, the asset passes the validation rules, then control passes to steps 54, 56 and 58, which are the cleansing, match code generation and clustering steps of the method.

In step 54, the asset description data is passed through the register service where it is prepared and cleansed (i.e., transformed) according to business rules defined for this kind of data asset in the knowledge base 34. These business rules specify how the "best record" should be represented in the system. These rules can be line-of-business-specific, company-specific, market-specific, etc. In addition, users of the system can modify and add rules to the knowledge base 34 to further specify how the asset should be represented. This "cleansing" operation is further described in US 2004/0123101 A1, which has been incorporated into this patent document by reference. Cleansing data can include detecting and correcting corrupt or inaccurate data (e.g., records), from a record set, table, or database. For example, cleansing data can include identifying incomplete or inaccurate data and subsequently replacing, modifying or deleting the incomplete or inaccurate data. Example "cleansing" rules may include: (a) address data—transform "Street" to "ST"; (b) address data—correct a postal code and add a postal code extension; (c) product data—standardize textural size descriptions to numerals; or (d) account number data—eliminate dashes between numerals. These are just a few examples of the many types of rules that can be applied by the knowledge base 34 to "cleanse" the asset description data provided by the calling application seeking to register an asset.

Following cleansing (step 54), one or more match codes are then generated for the asset description data in step 56. Match codes are generated from the incoming data asset based on additional rules in the knowledge base 34. The matching algorithms employed can be defined in any number of ways using any number of logical criteria. Match codes are preferably string value representations of data designed in such a way to allow "fuzzy" matching. In generating these match codes, many distinct match definitions may be applied to the input data (asset description data) in order to generate a match code that is useful in the subsequent clustering steps. Examples of these match definitions include: (a) phonetic transformation—"WR"="R" at the beginning of a word; (b) normalization—eliminate "noise" punctuation; or (c) explicit mapping—"Liz"="Elizabeth" or "NY"="New York", to describe but a few. Further details on the match code generation step are provided in relation to the description of FIG. 3, set forth below.

Following match code generation, the system then clusters the generated match codes for the asset description data in step 58 against match codes for other assets that have previously been registered with the asset repository system 20. The clustering step (step 58) is the part of the process in which the system analyzes the data asset information already stored in the hub to determine if there is a potential match between this prior data and the data associated with the new registration request. As described in more detail below with reference to FIG. 5, the output of the clustering process (step 58) are "cluster IDs" that are unique identifiers for data assets that match given a specified set of match criteria. The set of match criteria may be pre-programmed by a system administrator, or the criteria may be provided, at least in part, by a user of the system. The cluster process (step 58) can also report on which criteria the match was made, and the system may also provide the user with the option to only automatically match on some criteria, but flag other matches for manual review.

If the incoming asset is found to match an existing asset in the master reference schema 30 in step 60, by virtue of the same or similar cluster IDs, then the incoming asset is not "unique" to the system, and the data asset will not be registered and given a new unique enterprise ID. In this instance, control passes to steps 66-70 in which the system determines whether there are any attributes of the asset description data provided by this new request that may "enhance" the asset record stored in the master reference schema 30. For example, this asset, although not "new" to the system, may include additional data fields that are not stored in the "best record" version in the master reference schema 30, in which case the system may "enhance" the stored record 30 to include these additional data fields. In addition, the location of the input matching asset will be added to other data asset location information in the master database 30.

The process of steps 66-70 is also referred to herein as identity management, and it deals with the business rules that determine how to create a composite view of data assets given the "best record" information available to it from previous steps. These business rules are often specific to each organization where the asset repository hub 20 is deployed, although there may be some more universal rules as well that apply to any organization. Identity management rules determine what data attributes for each asset type are persisted in the master repository schema 30 and how to determine the best form of each attribute, for example: (a) phone number data—use the data that occurs most frequently in the cluster; (b) address data—use the street address value that is the longest; or (c) name data—use the first name that was most recently updated. In some circumstances, the identity management process will modify attributes on assets that have already been registered based on the business rules in place. It is possible, for example, that the registration of a new asset will merge several previously distinct assets into one large cluster of data that represents one asset. In this instance, the appearance of the new information, by some business rule process, has had a downstream effect on other assets which were previously stored in the system as separate assets. The asset repository hub 20 is continually scanning for these types of changes and will modify the information in the Master Reference Schema appropriately when necessary, as shown in step 68.

Going back to step 60, if a match is not found in the master reference schema 30 for the new asset, then a unique enterprise ID is assigned to the new asset in step 62, and in step 64, the new asset will be registered with the asset repository hub 20 by its inclusion in the master reference schema 30. This version of the data asset is added to the hub as the "best record" version presently known to the system along with a pointer to the original source system location that made the web service call to the asset repository hub 20 in step 42 of the method.

Figure 3:
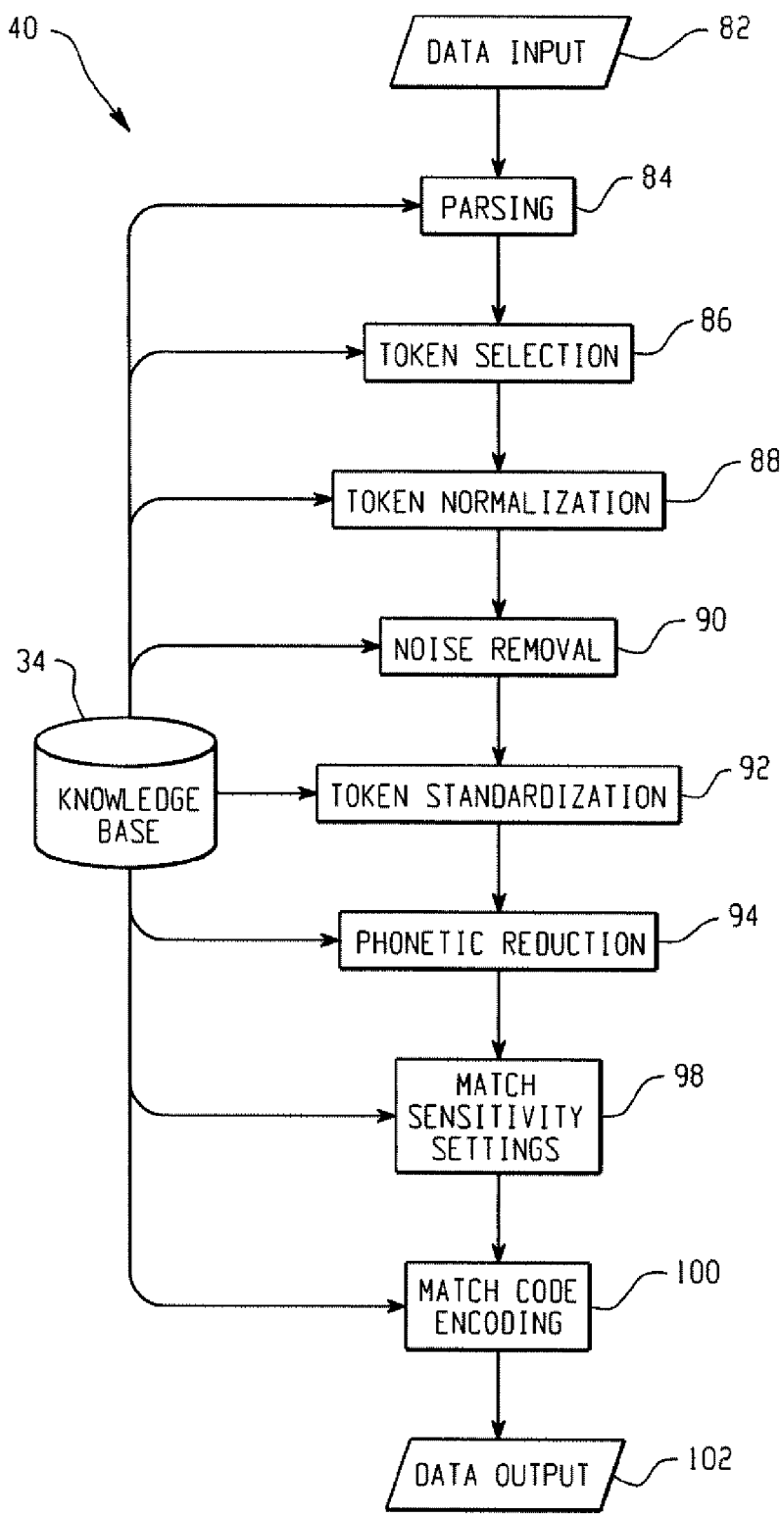
FIG. 3 is a flow diagram of an example method for generating match codes.

FIG. 3 is a flow diagram 40 of an example method for generating match codes. The example matching process described herein combines the principles of parsing and standardization with phonetic analysis to identify potential duplicate records in a database table. During match processing, match codes are generated for data strings provided from the source system making a registration request or searching for a registered asset. A match code is preferably an encoded or encrypted value representing portions of a data string that are considered to be semantically significant. Two data strings are said to "match" if the same match code is generated for each string.

For example, consider the following input data and correspond match codes:

| Input Data | Match Code |
|---|---|
| Bob Brauer | MYLY$$M@M$$$$$ |
| Mr. Robert Brauer | MYLY$$M@M$$$$$. |

These two name strings are considered a match because their corresponding match codes are the same, even though the input strings are different.

Typically, match processing is applied to several fields in a database simultaneously. Records assets in a database are considered to match if data strings from each analyzed field produce the same match codes across records. For example, suppose that match processing is applied to the "Name" and "Organization" attributes from a contact table as input:

| Input Data | | Match Codes | |
|---|---|---|---|
| Name | Organization | Name | Organization |
| Bob Brauer | DataFlux | MYLY$$M@/m$$$$$ | 8~GWX$$$$$$$$$ |
| Mr. Robert Brauer | DataFlux Corp | MYLY$$M@M$$$SSS | 8~GWX$$$$$$$$$ |
| Robert Brauer | General Motors | MYLY$$M@M$$$$$ | B3Y4G~$$$$$$$$ |

In this example, the first and second records match, because both have the same match codes for Name and Organization. The third record does not match either of the other records, however, because the match code generated for its organization field differs from those of the other records.

Turning back to FIG. 3, at step 82 the cleansed asset description data from the cleansing step (step 54) is provided as input data to the match code generation step (step 56). The remaining steps of the match code generation process deal with the processing of individual tokens within the input strings of the asset description data. The match system uses token-specific logic to generate a set of match values for a given input string. In doing so, one match value is generated for each token, and match values are then concatenated and encoded or encrypted to produce a match code for the entire input string.

Throughout the remaining description of the match code generation process the terms "match definition," and "standardization definition" are used. A "match definition" is synonymous with a matching algorithm, and is defined as the set of parameters processed by the asset repository hub 20 to produce the match codes. The parameters are items such as the number of tokens, which phonetic algorithm to apply (step 94), which noise words to remove (step 90), which regular expressions should be applied (step 92), and so forth. A "standardization definition" is a set of instructions used by the system when transforming the input data to a particular output.

In order for the match process to generate match codes for data types that contain multiple tokens, the portion of the input string corresponding to each token must first be identified. To accomplish this, the input strings are parsed (step 84) into one or more tokens according to a match definition for the type of input string. For example, suppose the "Name" match definition is applied to the following name: Mr. Robert Brauer. The Name match definition specifies that the Name parse definition should be used to obtain token values for a name. The match system therefore invokes the parsing step (step 84) with the Name parse definition and the following tokens are generated:

| | |
|---|---|
| Name Prefix | Mr. |
| Given Name | Robert |
| Middle Name | — |
| Family Name | Brauer |
| Name Suffix | — |
| Name Appendage | — |

Each token returned by the parsing step (step 84) for this parse definition represents a token in the Name data type. The match system can thereby apply specific logic to each token to produce a match code.

After defining the tokens that will be processed in each match definition, the next step (step 86) in generating the match codes is to decide which tokens should contribute values to the match code for a particular input string. This token selection step 86 is used because some tokens are more significant than others with regard to the semantic value of a string. For example, consider the following names: (a) Bob Brauer; (b) Mr. Bob Brauer; (c) Bob Brauer Jr.; (d) Bob Brauer, Jr.; and (e) Bob J. Brauer. Each name potentially represents the same individual. When parsed, as in step 84, these names yield the following tokens:

| Prefix | Given Name | Middle Name | Family Name | Suffix | Apppendage |
|---|---|---|---|---|---|
| | Bob | | Brauer | | |
| Mr. | Bob | | Brauer | | |
| | Bob | | Brauer | Jr. | |
| | Bob | | Brauer | | JP |
| | Bob | J. | Brauer | | |

In this example, each name string is composed of a different combination of token values. Notice, however, that the Given Name and Family Name token values are consistent across different names. It is for this reason that each string might be a different representation of the same name. The tokens Given Name and Family Name are semantically significant in the names definition. This means that these two tokens determine the identity of the individual they represent. The remaining tokens add information about the individual, but their values are not significant for the purposes of identifying the individual.

Thus, according to step 86, when a match code is generated for a name string, for example, the values of the Given Name and Family Name tokens are processed and the values of the other tokens are disregarded. In a similar manner, for each multi-token match definition, certain tokens are marked as significant, and the match system will then process the significant tokens and disregard insignificant tokens when generating the match codes.

After identifying the significant token values in an input string in step 86, the match system process then proceeds to generate a match value from each significant token value using the steps 88 (token normalization), 90 (noise removal), 92 (token standardization), and 94 (phonetic reduction). A match value is a compressed and standardized value that captures the semantic identity of a token value. Match values are then concatenated to form a match code.

The token values from step 86 are first normalized in the token normalization step 88. Normalization is a two-step procedure that prepares a token value for further processing. Normalization in this matching context is similar to normalization in parsing and standardization. The steps to normalize a token value may include capitalization and regular expression string manipulation. As in standardization, the first step in normalization of values in matching is converting each value to an uppercase value. To complete normalization of token values, it may, in some cases, be necessary to apply special string manipulation logic. This type of logic is typically used to eliminate insignificant portions of a token or to perform character replacements. This phase of normalization prepares token values for scheme and vocabulary lookups and other final stages of match value generation.

To illustrate the type of normalization that can be achieved using token-specific string manipulation, a few examples of given name processing are provided herein. In the United States, for example, some given names contain two or more words. For these names, however, only the first word of the name is considered significant for the purposes of matching. Therefore, a regular expression is defined to eliminate all words from a string except the first word:

BILLY BOB>BILLY

MICHAEL THOMAS>MICHAEL. A match value is then created for the remaining word.

In other countries, names may contain prefixes that might also be considered insignificant for the purposes of matching. For example, some Arabic names use articles as a prefix, such as EL SAID. Because a prefix such as "EL" is considered insignificant, it can be removed from the name as part of the normalization phase, so that EL SAID becomes SAID. This assures the name "EL SAID" will match the name "SAID."

Another example of string manipulation used for normalization involves character substitution. In some languages, there may be multiple ways to represent a character or group of characters. This is particularly common in written languages that contain diacritics. For these cases, a preferred representation is chosen for the characters in question. All representations of the characters can then be replaced by the preferred representation. As an example, consider the German umlaut. The umlaut is often represented by placing the letter "E" after the base character to which the umlaut would otherwise be applied. It is also sometimes completely omitted during data entry. Thus a word with an umlaut may have three different representations: (i) JORG; (ii) JOERG; or (iii) JORG.

Because the system should generate the same match code for each of these three variations, a preferred representation is chosen and the other representations are then normalized to the preferred representation. In this example, the most basic representation may be chosen as preferred, resulting in the following normalization:

JÖRG>JORG
JOERG>JORG
JORG>JORG.

The discarding of umlauts or other diacritics may at first seem to be a destructive operation that will result in data loss. However, matching does not transform data in the database; rather, it simply normalizes working copies of the data in memory to generate match codes so that the broadest possible set of matching records can be identified.

Following the token normalization step (step 88), the process of match code generation then proceeds to the noise removal step (step 90). The match process is preferably designed to disregard semantically insignificant portions of an input data string and to create a match code from the remaining data. Disregarding values of insignificant tokens is one way in which this occurs. A related feature of the match process is the ability to disregard individual words in a string. Even after insignificant tokens have been eliminated from consideration, such as in step 86, semantically insignificant words may still exist within the value of a remaining token. The process of eliminating these words is carried out by the noise removal step 90.

For example, consider an Organization match definition. There is one token defined for this match definition: Organization. Because Organization is the only token, it is considered significant. This token can sometimes contain insignificant words, however. For example: "DATAFLUX CORP." In this string, the word "CORP" is insignificant with regard to the identity of the organization, and thus the word can be removed from this string to produce a more succinct representation. By applying this logic to organization strings, the same match code can be generated for the following two strings: (1) DATAFLUX CORP; and (2) DATAFLUX.

Semantically insignificant words are referred to herein as noise words. To remove noise words from a token value, as in step 90, a Noise Word Vocabulary lookup is performed. If a word is found in the Noise Word Vocabulary, which may be stored in the Knowledge Base 34, then the word is removed from the token value. One or more Noise Word Vocabularies may be specified for a token, and some tokens will not have any associated Noise Word Vocabulary.

After the token values have been normalized and cleansed of noise words in steps 88 and 90, the remaining words and phrases in the token values may then be standardized in step 92. The level of standardization used for matching is typically greater than the level of standardization employed by a standardization definition. Because matching does not transform any of the data, but instead generates match codes used to identify potential duplicate records, there is no risk of corrupting data by over-standardization during the matching process. Thus, the system may be programmed to standardize words and phrases in any manner that will yield the broadest possible set of matches.

Each standardization scheme developed for a standardization definition can also be used for standardization during the matching process. In addition, it is generally desirable for the matching process to utilize new standardization schemes to standardize words or phrases that are not necessarily to be standardized using a standardization definition. For the matching process, any type of word or phrase that has multiple recognizable values should be standardized in order to increase match probabilities.

For example, consider the following street name: SANDY BOTTOM. Although it is possible to create a standardization scheme for words that commonly appear in street names, for an Address standardization definition, this would not typically be done because it is not desirable to transform words in street names in a database. During the matching process, however, there is no concern with information loss, so as part of the match logic for addresses, street words can be standardized. An example of this is: SANDY BOTTOM>SANDY BTM.

When this type of standardization is performed, the following two street names will contribute the same value to a match code: (i) SANDY BOTTOM; and (ii) SANDY BOT. This is a result of standardizing each representation of BOTTOM to the same value:

SANDY BOTTOM>SANDY BTM; and

SANDY BOT>SANDY BTM.

As another example, consider the Organization match definition, which uses a standardization scheme to standardize common business words in organization names. For example: MIDWEST OFFICE SUPPLY>MDWST OFC SUPL. The Organization standardization definition does not use this standardization scheme because it is undesirable to transform non-noise business words in a database entry.

Following the token standardization step (step 92), the match code generation method of FIG. 3 then reduces the standardized token values by applying phonetic analysis in step 94. The goal of phonetics processing is to facilitate the matching of words with similar pronunciations and/or spellings. In doing so, silent or unnecessary letters are eliminated. Complex groups of letters are changed to simpler spellings that represent similar sounds. Although different phonetics rules for each significant token in a match definition can be employed, in most cases, however, the same library (or libraries) of phonetics rules can be used for each significant token.

Having normalized, standardized and reduced the tokens in steps 90-94, the method of FIG. 3 then proceeds to generate the match codes in steps 98 and 100. The generated match codes are then output in step 102 as inputs to the clustering step 58 of FIG. 2.

As noted above, a match code is a concatenation of match values. Data bit positions within the match code are preferably reserved for specific token values according to match definition and sensitivity. Each significant token has a set of character positions reserved for its match value in the match code. A match code may contain up to 255 characters, but 15 characters will generally suffice for most types of data. Some match values may be longer than the allotted space for their token. In these situations, match values are truncated to fit within the token's area.

Punctuation cleaning and phonetics may reduce the lengths of match values from the original lengths of their token values. Therefore, match values typically do not need to be truncated to fit into a match code. Also, because data entry errors occur most frequently at the ends of long words, the truncation of long match values effectively causes match processing to disregard the portions of words that are most likely to differ in near-duplicate records. This has a positive effect on match results.

For example, consider the match code layout for a Name match definition:

| Name Match Value Positions |
| --- |
| 1 2 3 4 5 6 7 8 9 10 11 12 13 14 15 |
| \|----------------\|--------------------\| |
| Family Name    Given Name |

In this example, Positions 1-9 of the match code are populated with the match value for the Family Name token and positions 10-15 are populated with the match value for the Given Name token. Here, the area defined for the Family Name token is larger than the area defined for the Given Name token because the Family Name token is considered slightly more significant than the Given Name token. The relative significance of tokens may be evaluated for each match definition before assigning positions for match values in the match code.

In step 98 of FIG. 3, the match process allows a user to specify a sensitivity value that determines the amount of "fuzziness" in the match code generated for an input string. A match code generated with a high sensitivity value will be a more exact representation of the input string than a match code generated with a low sensitivity value. Sensitivity values may range from a high of 95% to a low of 50%. If a high sensitivity value is applied, then some match reports may miss duplicate records, but few "false hits" will be reported. Alternatively, if a low sensitivity value is selected, then some match reports may identify almost all duplicate records, but many "false hits" will also be reported.

One example sensitivity algorithm associates fewer characters from each token's match value with decreasing sensitivity. Thus, at high sensitivity, more characters from the token are used when matching, and at low sensitivity fewer characters from the token are used, with the most significant characters being at the beginning of the match value. So, for example, if the given name is S-M-I-T-H, and the sensitivity is set high, then all 5 characters may be used in the match code, whereas if the sensitivity is set very low, then perhaps only the characters "S" and "M" are used in the match code.

Finally, in step 100, the match codes are encoded, using any of a variety of encoding algorithms, and then output at step 102 to the clustering algorithm (step 58).

FIG. 4 is a diagram 110 showing several examples of generating match codes according to the methodology of FIG. 3. The first column 118 of this table diagram shows the processing step of FIG. 3. The second column 120 shows a first asset description data input, and the third column 12 shows a second, distinct asset description data input. In each of the examples 112, 114, 116, the processing steps are applied to the first and second asset description data to show how the same match code is generated. For example, in the case of the first example 112, the first asset description data "Ronald J Agresta" and the second asset description data "Mr. Ron Agresta" are parsed (step 84), tokens are selected (step 86), the tokens are normalized (step 88), noise words are removed (step 90), the tokens are standardized (step 92), phonetically reduced (step 94), and finally the encoded match codes are generated (step 100).

Figure 5:
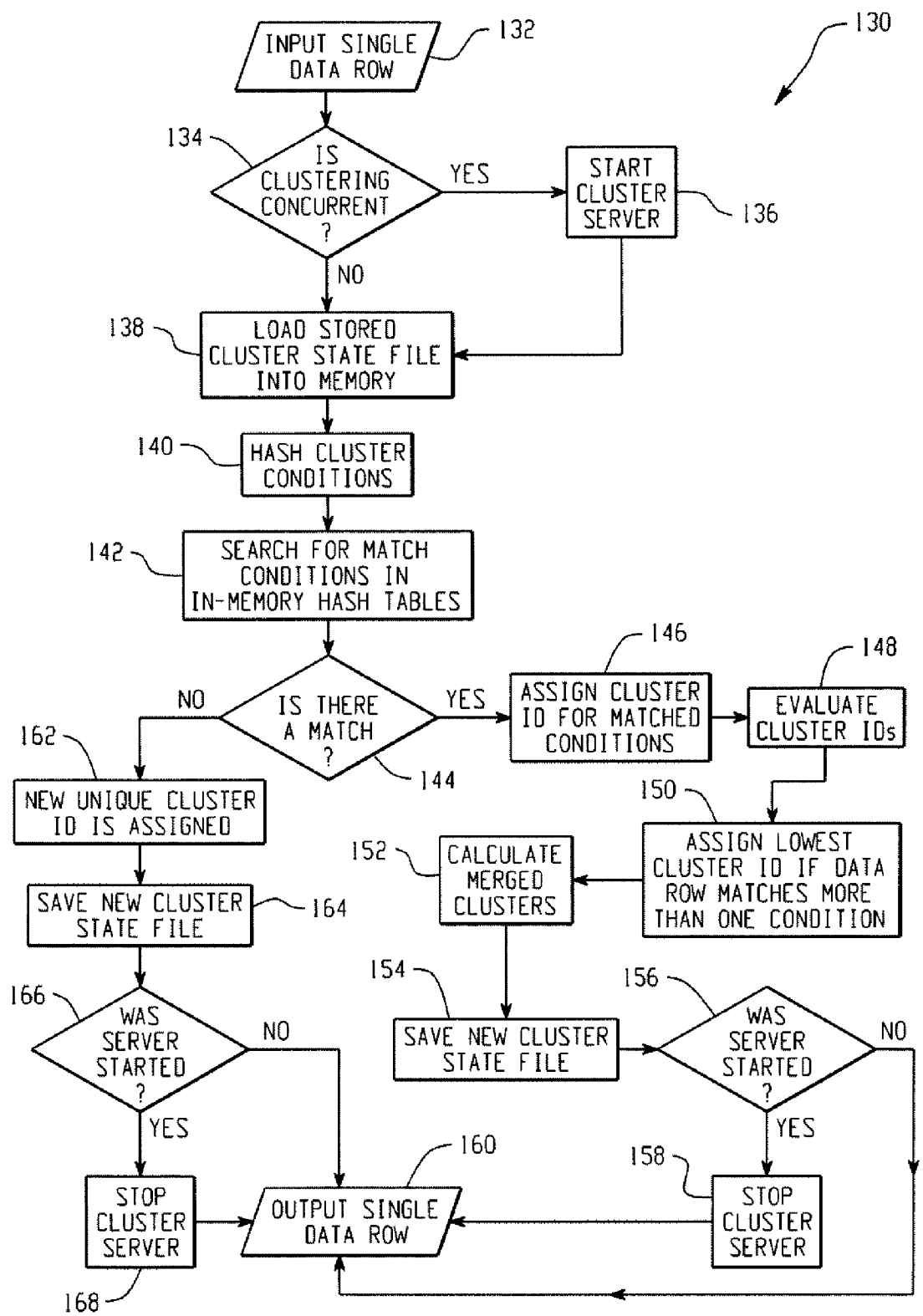
FIG. 5 is a flow diagram of an example method for clustering match codes.

FIG. 5 is a flow diagram 130 of an example method for clustering match codes. The term "clustering" refers, generally, to the grouping of data rows by one or more conditions configured by the user. In a given cluster (i.e., group) of data rows every row has at least one condition that matches that condition in at least one other data row. For each data row in the cluster, the output of the clustering process provides an integer cluster ID. In addition, for each condition in a data row that has been clustered, the output contains a flag identifying whether or not the condition matched a condition in another data row.

For example, consider the following cluster table showing a Row ID, first and second conditions, a cluster ID, and matching logic:

| Row ID | Cond-1 | Cond-2 | ClustID | Match-1 | Match-2 |
|--------|--------|--------|---------|---------|---------|
| 1 | A | 1 | 0 | False | True |
| 2 | B | 2 | 0 | True | False |
| 3 | B | 1 | 0 | True | True |
| 4 | 1 | B | 1 | False | False |

In this example with two clustering conditions, for a row to be in the same cluster as another row its first condition (Cond-1) must match that of another row, or its second condition (Cond-2) must match the same condition in another row already in the cluster. In the above example, rows 1 and 3 are in the same cluster because their condition 2 matched, while rows 2 and 3 are in the same cluster because their condition 1 matched. Rows 1 and 2 do not have any matching conditions, but they belong to the same cluster because of row 3. Row 4 has no conditions that match corresponding conditions of any other row, and therefore it is in a cluster by itself.

There are two types of clustering processes described herein, a batch mode process, and a real-time mode process. Although both processes share the same core clustering algorithm, there are significant differences in how they handle the data set being clustered. For example, in the batch mode process, the entire data set must be loaded into memory before the final cluster ID for each row can be determined. As each row is loaded into the batch mode process, an initial cluster ID is returned. After all rows in the data set have been loaded, the batch mode process then returns the final cluster ID for the given initial cluster ID.

The real-time mode process does not load all of the data rows to be clustered before producing cluster IDs, but instead operates on a single row at a time, producing its cluster ID as the row is added. In both modes, the process of adding another row might change cluster IDs assigned to already processed rows. In the batch mode process, this is handled internally by the algorithm, and the user sees only the final cluster IDs. However, because the real-time mode process works on a single rows at a time, it returns cluster IDs correctly only in the context of rows that have already been clustered. Therefore, the real-time mode has an additional type of output for each row it clusters, referred to as the "collapsed cluster ID", which is an existing cluster ID that was changed to the cluster ID of the currently added row as the result of adding that row to the cluster.

The core clustering algorithm used in both modes discussed above is based on hash tables that are used to store unique conditions. The key advantage of using hash tables is that any element in it can be found in near O(1) complexity. A clustering condition (raw bytes) is passed to a hashing function that produces an index of the bucket in the hash table (which is an array of buckets) where that condition should be. Because different conditions can hash to the same bucket (i.e., hashing collision), each bucket points to a linked list of conditions (or NULL, if no conditions have been hashed to that bucket). For each condition in a data row there is a separate hash table.

When a data row is clustered, each condition is hashed into the corresponding hash table and the linked list of conditions off of this bucket (if there is one) is searched to make sure that this new condition is not already in the list. If a matching condition is not found, then the new condition is added to the end of the linked list and is given a new cluster ID. If a matching condition is found, however, then the new condition is not added to the linked list and the cluster ID from the matching condition is assigned to the new condition. When all conditions of a data row have been hashed, the lowest cluster ID assigned to any one of the conditions of this data row becomes the overall cluster ID for the data row. If there are different cluster IDs assigned to different conditions of the data row, then that data row caused one or more of the existing clusters to be collapsed into one.

In order to keep track of collapsed cluster IDs, a binary file is utilized where at each cluster ID index, there is either an integer flag indicating this cluster ID is not mapped (i.e., has not been collapsed) or there is an integer cluster ID to which the given cluster ID was collapsed. So, if at index 10 of the file there is an integer 4, then this means that cluster ID 10 was collapsed to cluster ID 4. In case of the batch mode process, before final cluster IDs are available, this binary file is processed so that all chains of collapsed cluster IDs point to their final cluster IDs—meaning that if cluster ID 4 was mapped to cluster ID 3 and cluster ID 3 was mapped to cluster ID 0, then cluster ID 4 needs to be remapped to cluster ID 0. In this way, when the user asks for the final cluster ID for the initial cluster ID of 4, the batch mode process will return a cluster ID of 0 and not 3. In case of the real-time mode process, for each clustered data row its current cluster ID is returned along with any cluster IDs that were collapsed to the one given to the data row, if any, so that affected cluster IDs of already processed data can be updated.

Turning back to FIG. 5, the clustering process begins at step 132 when a single data row is input to the process. Step 134 determines if the clustering is concurrent, and if so then the cluster server is started in step 136. Concurrent clustering occurs when multiple clients of the clustering process are passing in rows to cluster. In this case, the cluster server is started in order to serialize the multiple requests from the clients. If clustering is not concurrent, then it is consider exclusive, meaning that only a single client is allowed to cluster rows against a particular cluster state file. Control passes to step 138 where the cluster state file is loaded into memory. At step 140 the cluster conditions are hashed, and at step 142, the method searches for match conditions in the in-memory hash tables.

If a match occurs between the current data row and the data stored in the in-memory hash tables, then control passes to step 146 where a cluster ID is assigned for the matched conditions. The cluster IDs are then evaluated in step 148, and the lowest cluster ID is assigned to the data row if the data row matches more than one condition in the hash tables. Merged clusters are then calculated/formed at step 152, and the new cluster file is then saved as the current state file in memory. If the server was started in step 136, then based on the condition of step 156, the server will be stopped in step 158 and the process will output the cluster ID data associated with the single data row at step 160. Processing of this row is then complete.

If a match did not occur between the current data row and the data stored in the in-memory hash tables, then control passes to step 162, where a new, unique cluster ID is assigned to the data row. The new cluster file, including this new data row, is then saved as the current state file in memory. Once again, if the server was started in step 136, then based on the condition of step 166, the server will be stopped in step 168 and the process will output the cluster ID data associated with the single data row at step 160. Processing of the row is then complete. For each new data row to be clustered, the process of FIG. 5 is repeated.

An example of the above-described clustering algorithm is now presented. In this example several rows are clustered by two conditions—name and phone number. A typical usage scenario for this would be to identify records for the same household. The example uses the following record data. Hash table 1 stores the unique name data and hash table 2 stores the unique phone number data.

| Rec# | Name (cond 1) | Phone (cond2) |
|---|---|---|
| 1 | Allen | 111-2222 |
| 2 | Bill | 222-3333 |
| 3 | Carl | 333-4444 |
| 4 | Dave | 444-5555 |
| 5 | Fred | 222-3333 |
| 6 | Bill | 444-5555 |
| 7 | Allen | 444-5555 |

When Rec #1 is added to the cluster state file (step 138), the name "Allen" is hashed into table 1 (step 140). There are no conditions off of the hashed bucket, so "Allen" is copied into memory and the hash bucket is set to point to that chunk of memory. Because "Allen" did not match anything (step 142), its cluster ID is set to −1 (indicating that its cluster ID is not set). The phone number of Rec #1, "111-2222" is then hashed into table 2. There are no conditions off of the hashed bucket, so "111-2222" is copied into memory and the hash bucket is set to point to that chunk. Because "111-2222" did not match anything its cluster ID is set to −1.

Next, the cluster IDs for both conditions are compared to see if they differ. They are both the same, meaning that the addition of this row did not collapse any existing clusters. <Moreover, they are both −1, meaning this row does not fit into any existing clusters. The row as a whole gets a new cluster ID, which is 0 (step 162). That cluster ID is set for each condition stored in memory.

When Recs 2, 3, and 4 are added, they follow exactly the same process as for Rec 1. Namely, each condition, after it is hashed into the corresponding hash table, is not found to match anything in that table, which means that the record as a whole gets a new cluster ID (1, 2, and 3).

When Rec 5 is added, the name "Fred" is hashed into hash table 1. A match for that condition is not found, so "Fred" is copied into memory, a hash bucket is set to point to that chunk, and the condition's cluster ID is set to −1 because the condition did not match anything. Subsequently, the phone number "222-3333" is hashed into hash table 2, but in this case the hash table is found to contain a matching condition—originally inserted into the table when Rec 2 was clustered. Therefore, the "222-3333" condition from Rec 5 does not get stored, because a match already exists in the table and the cluster ID of the matching condition is 1 and is used for the duplicate condition.

Next, cluster IDs for both conditions of Rec 5 are compared to see if they differ. In this case they do differ, as the first condition for the Name is −1 and the second one for the Phone Number is 1. The entire record's cluster ID is set to 1 (as the only valid cluster ID) and the cluster ID associated with condition "Fred" is changed from −1 to 1. At this point records 2 and 5 both belong to cluster 1.

When Rec 6 is added, the name condition "Bill" is hashed into table 1. Because "Bill" already exists in the hash table—originally inserted when rec 2 was clustered—this condition's cluster ID is set to 1. The phone number condition "444-5555" of Rec 6 is then hashed into table 2. The table is found to contain a matching condition—originally inserted when Rec 4 was clustered—and therefore this condition from Rec 6 does not get stored because it already exists in the table. The cluster ID for the found matching condition is 3 and is used for the phone number condition of Record 6.

Next, cluster IDs for both conditions of Record 6 are compared to see if they differ. They do differ, as the first condition has a cluster ID of 1 and the second condition has a cluster ID of 3. This means that adding record 6 caused two clusters, 1 and 3, to collapse into a single cluster. The entire record's cluster ID is therefore set to 1, which is the lowest one of the matched conditions' cluster IDs (step 150).

All of the rows that were in cluster 3 now should be changed to be in cluster 1. In this example there is only 1 row (2 conditions) in cluster 3, but in a real-life application there can be millions of such rows and conditions, scattered across files and memory. It would be very slow to search all stored conditions to find all those belonging to cluster 3 to change them to cluster 1. To avoid doing this inefficient search and replace operation a "collapsed cluster ID" table is utilized. The collapsed cluster ID table is preferably a one-dimensional integer array where each index/bucket corresponds to the initial cluster ID and a value at that index/bucket corresponds to the final cluster ID. To indicate that cluster 3 is collapsed into cluster 1 the table at index/bucket 3 will get a value of 1. The rest of the buckets, from 0 through 2, will have a value of −1, indicating cluster IDs 0 through 2 are not collapsed.

As the result of clustering Rec 6, no conditions were copied to memory and linked to the hash tables, the collapsed cluster IDs table received a new entry to indicate cluster 3 was collapsed to cluster 1, and the overall returned cluster ID for rec 6 is now 1.

When Rec 7 is added, "Allen" is hashed into hash table 1 and found to already exist there. The matching condition was inserted when record 1 was clustered and has a cluster ID of 0, so condition 1 from Rec 7 gets a cluster ID of 0. The phone number condition "444-5555" is then hashed into table 2 and found to already exist there. The matching condition was inserted when record 4 was clustered and has a cluster ID of 3 (the initial cluster ID for record 4). Next, cluster IDs for both conditions of Rec 7 are compared. They differ, as the first condition has a cluster ID of 0 and the second has a cluster ID of 3. That means Rec 7 caused cluster 3 to collapse into cluster 0. Record 7 therefore gets the overall cluster ID of 0 (the smallest of the two). Because Rec 7 collapsed cluster 3 into cluster 0, all conditions with a cluster ID of 3 need to be changed to a cluster ID of 0. Instead of searching for all such conditions and updating their cluster IDs, the collapsed cluster IDs table is used instead.

Examining the collapsed cluster IDs table, it is seen that cluster 3 was already collapsed into cluster 1, so all conditions that have a cluster ID of 3 should have a cluster ID of 1. Therefore, clustering record 7 caused cluster 1 to be collapsed into cluster 0. To reflect this, a value of 0 is set in the index/bucket of 1 in the collapsed cluster ID table, which means that cluster 1 was collapsed into cluster 0. Now, the collapsed cluster IDs table has a chain of collapsed cluster IDs, from 3 to 1 and from 1 to 0.

As the result of clustering Rec 7, no conditions were copied to memory and linked to the hash tables, the collapsed cluster IDs table was provided with a new entry to indicate cluster 1 was collapsed to cluster 0, and the overall returned cluster ID for Rec 7 is 0.

At this point in the cluster processing, all of the records have initial cluster IDs, the memory has all unique conditions, and the collapsed cluster IDs table contains information regarding the collapsed clusters. The last step is to set the final cluster ID for each record. This is done by reading values at indexes/buckets of the collapsed cluster IDs table to find the final cluster ID, as follows for each record.

Rec 1 has a cluster ID of 0, which cannot be collapsed into anything else because the to lowest cluster ID is always used, so rec 1 already has the final cluster ID.

Rec 2 has a cluster ID of 1, and looking up the bucket at index 1 in the collapsed cluster IDs table it is determined that it has a value of 0, which means the final cluster ID for Rec 2 is changed from 1 to 0.

Rec 3 has a cluster ID of 2, the bucket at index 2 has a value of −1, which means cluster 2 is not collapsed and the final cluster ID for Rec 3 is still 2.

Rec 4 has a cluster ID of 3, the bucket at index 3 has a value of 1, meaning that the cluster ID of 3 was collapsed to cluster ID 1; the bucket at index 1 has a value of 0, meaning cluster ID of 1 was collapsed to cluster ID 0; the bucket at index 0 has a value of −1, meaning that the cluster ID was not collapsed; so, after following the chain of collapsed cluster IDs, the final cluster ID for Rec 4 is changed from 3 to 0.

Rec 5 has a cluster ID of 1, the bucket at index 1 has a value of 0, the bucket at index 0 has a value of −1, meaning this cluster ID is not collapsed; therefore, the final cluster ID for Rec 5 is 0.

Rec 6 has cluster ID of 1, and from the collapsed cluster IDs table it is determined that the final cluster ID for that record is 0.

Rec 7 has cluster ID of 0, which is not collapsed into any other cluster ID, so that is the final cluster ID for rec 7.

The foregoing description has presented just one example of clustering functionality.

Figure 6:
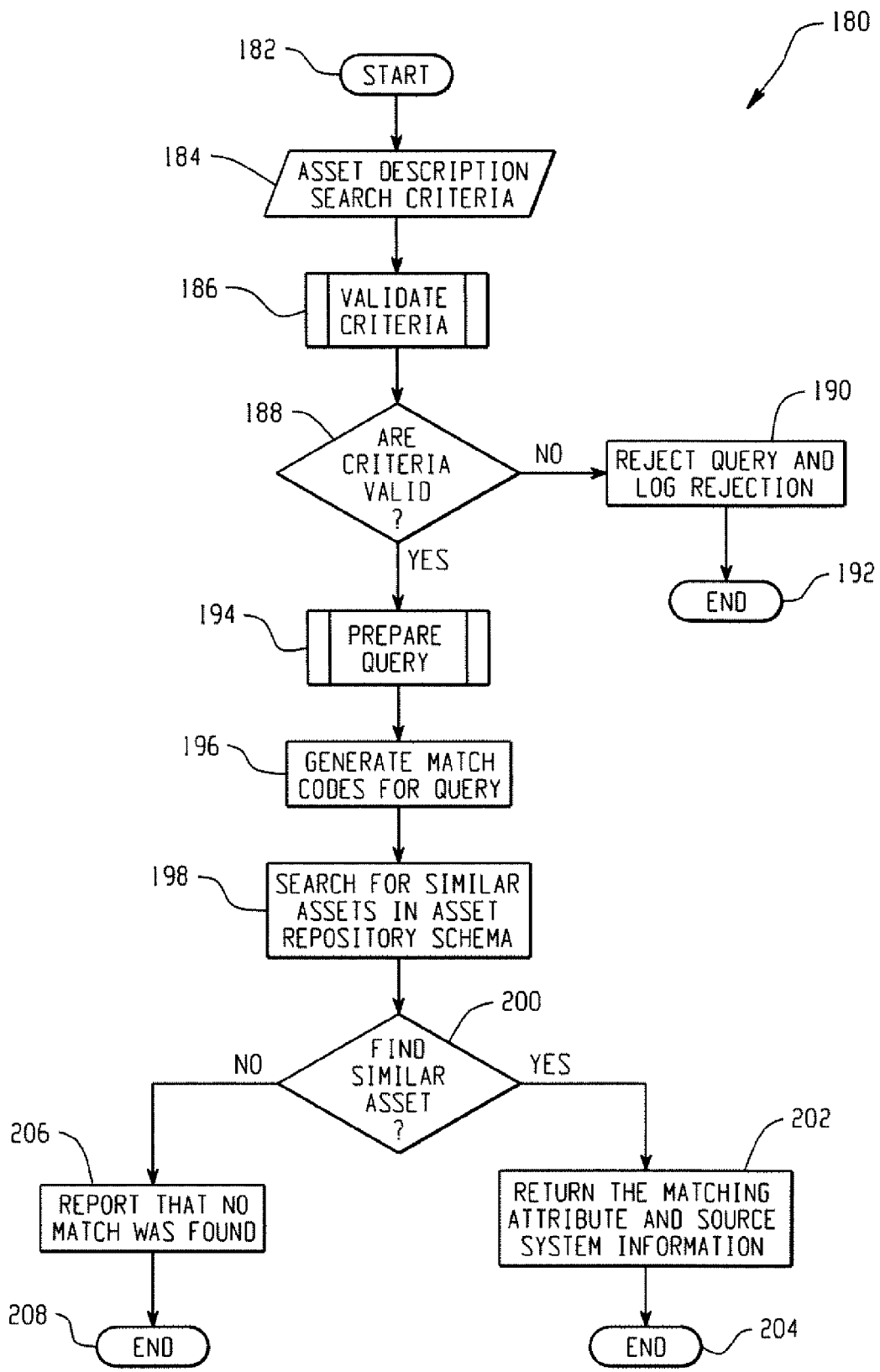
FIG. 6 is a flow diagram depicting a method of searching the asset repository hub for a data asset.

FIG. 6 is a flow diagram depicting a method 180 of searching the asset repository hub 20 for a data asset. As noted above, once an asset is registered, it represents the best version of that asset, and may represent a combination of attributes taken from contributing source systems where multiple versions of the asset are registered by the different source systems. Each source system that is aware of this asset is stored in the hub 20 along with the asset information so that other applications can reference it appropriately.

For example, in step 182 of FIG. 6, the method of searching for and locating an asset within the system begins when an application makes a web service call to the asset repository hub 20, passing pertinent data asset information to a "search" service (step 184) that is hosted on the process server 28. In step 186, the data asset description search criteria is validated against a set of rules specific to the type of data being validated. If the incoming data asset search criteria does not pass certain validation rules, as determined at step 188, then the query is rejected at step 190 and the search method ends.

If the incoming data asset search criteria is valid, however, then the asset search information is passed through the search service 32 in step 194, where it is prepared according to business rules defined universally for this kind of data asset from the knowledge base 34. This "preparation" process (step 194) facilitates improved searching for the data asset in question. Following the preparation step, match codes are generated from the incoming data asset information in step 196 based on rules in the knowledge base 34 in a similar manner to how the match codes were generated when registering an asset in FIGS. 2-4. Having generated match codes for the asset description search criteria, the method then proceeds to step 198, in which the match codes are provided to a clustering search process, using similar clustering concepts to those described above with reference to FIG. 5.

If a similar asset to that described by the match codes from step 196 is found in the asset repository, in step 200, then the asset attributes and the original source system location information is returned to the user or to the calling application in step 202, and the process ends at 204. If an asset match is not found based on the match codes from step 196, then the user or application is notified in step 206 that an asset meeting the asset description search criteria was not found in the asset repository hub 20. The method then ends at 208.

Figure 7:
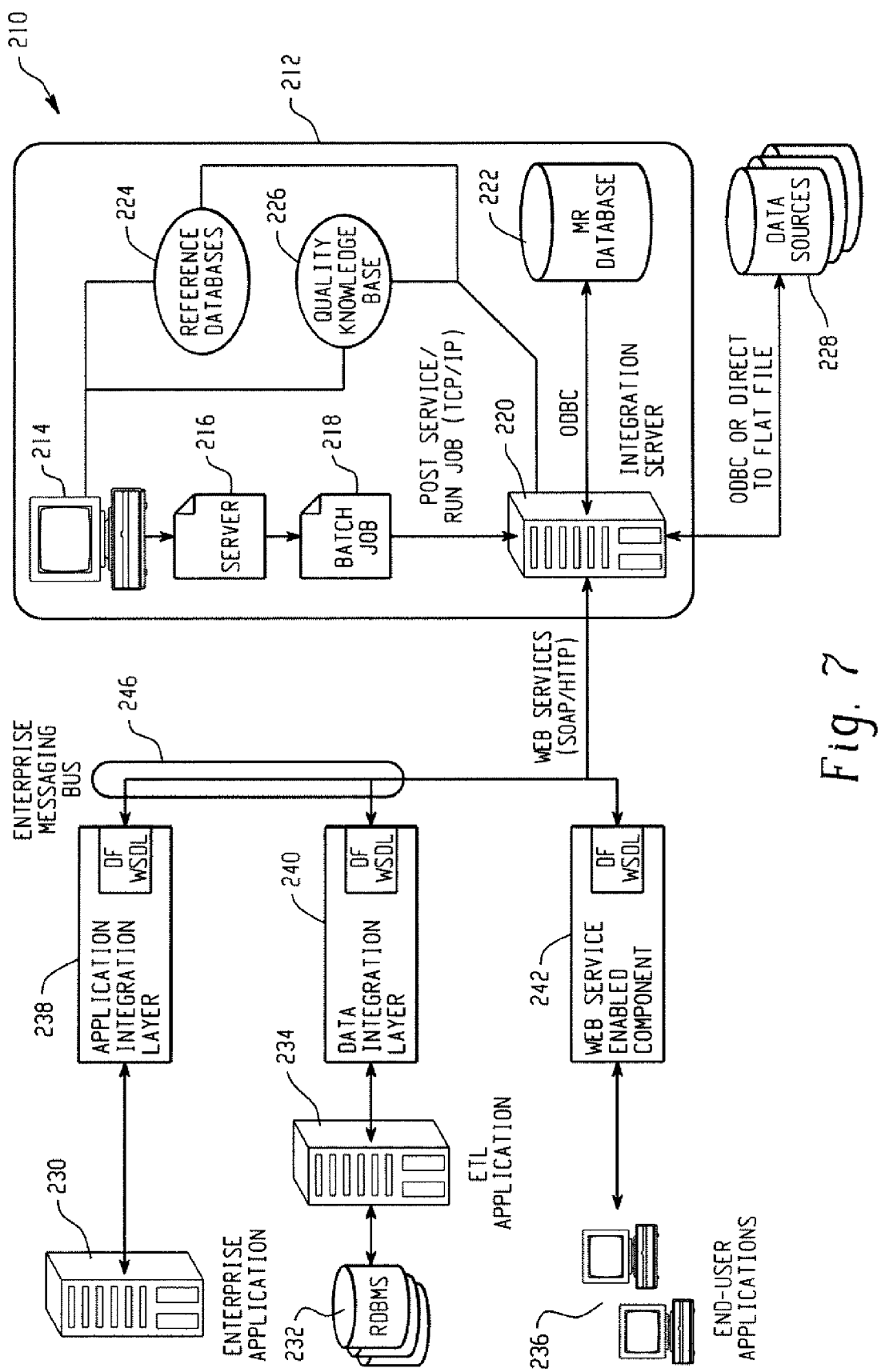
FIG. 7 depicts a typical deployment of an asset repository hub in an IT environment.

FIG. 7 depicts a typical deployment 210 of an asset repository hub 212 within a networked IT environment. The hub 212 includes a process server 220, also referred to herein as an integration server, reference and knowledge databases 224, 226, and a master reference database 222. These elements have already been described in detail in this patent document. The means of communication to both pass information in and out of the system and to initiate jobs or services on the process server is done through a service oriented architecture (SOA). More specifically, web services are used to encapsulate communication, data access, transformation rules, and processing specifics to the integration server 220.

A variety of methods of communicating with the integration server 220 are provided in this implementation, including a direct connection through a terminal 214, which initiates server functions 216 and batch jobs 218, and through directly connected data sources 228 which may uses ODBC or direct to flat file types of communications with the process server 220. In addition, network based web service calls via SOAP/HTTP may be made from enterprise applications 230, ETL applications 234 and/or end-user applications 236. These network based service calls may be implemented using application integration layer 238, data integration layer 240 and web service enabled component layer 242 technologies for communicating with the asset repository hub 212.

Figure 8:
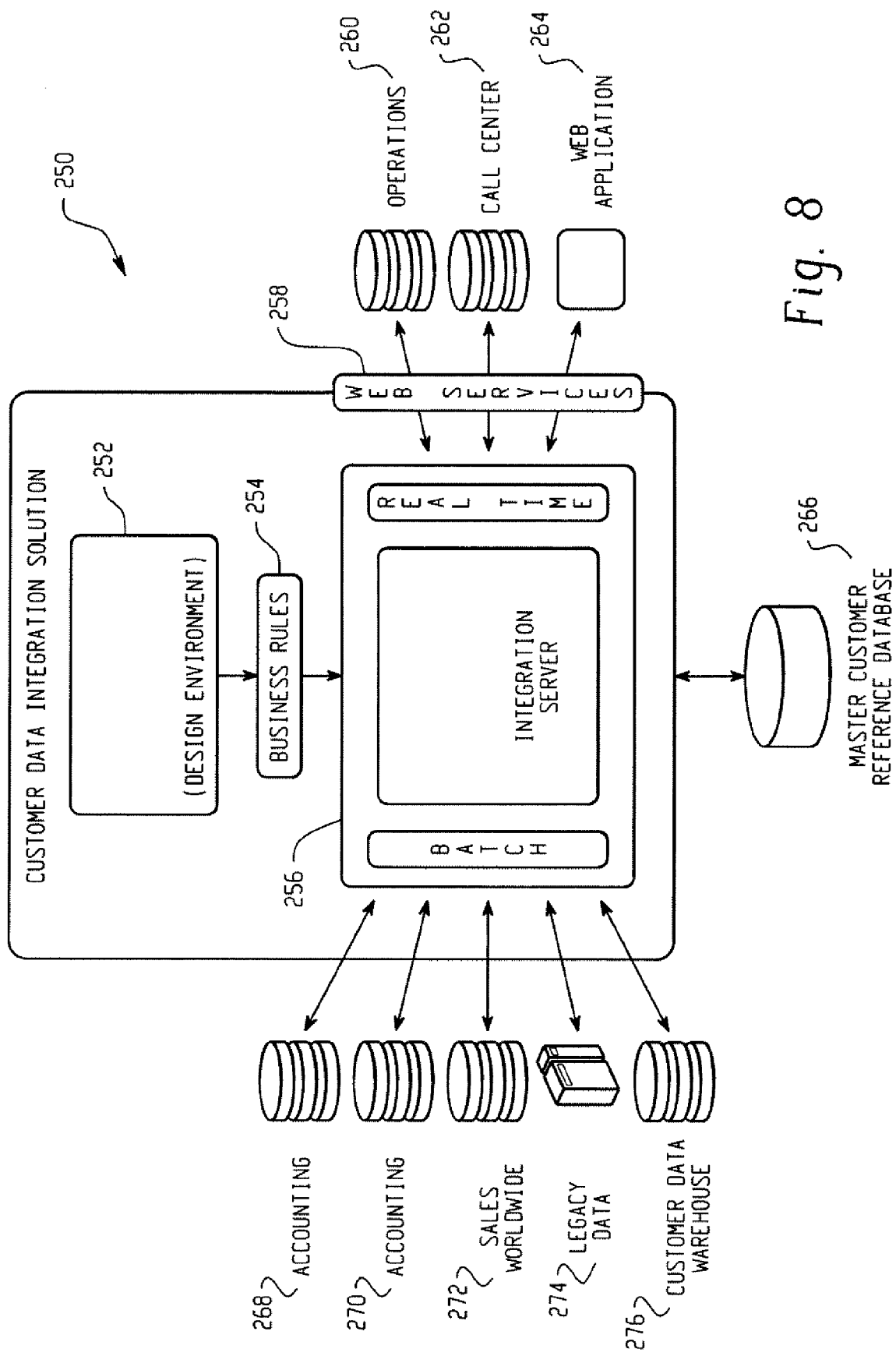
FIG. 8 describes a Customer Data Integration (CDI) example application having an asset repository hub.

FIG. 8 describes a Customer Data Integration (CDI) example application 250 having an asset repository hub 256. As noted above, the asset repository hub can take on any number of incarnations depending on the type of data being tracked or the type of business objective. One specific variation of the asset repository hub is the Customer Data Hub shown in FIG. 8. This type of hub deals specifically with customer data as the "asset" being tracked. The CDI solution includes a design environment 252 for managing services through the integration server 256, a knowledge base of business rules 254 for managing the format and consistency of the customer data assets, and the master customer reference database 266.

As shown in FIG. 8, both batch and real-time services are enabled through the same process hub (labeled "integration server.") The integration server 256 operates in conjunction with the knowledge base 254 and the master customer database 266 to drive the customer data integration solution using the same means as the more generic asset repository hub discussed above, but it has been tailored to work specifically with customer data assets. Real-time services through operations center 260, call center 252 and web applications are invoked through the web services interface 258 of the system, whereas batch mode processes from accounting systems 268, 270, sales systems, legacy source systems 274 and customer data warehouse systems 276 are invoked through the batch interface to the integration server 256. As noted above, an advantage of the processes described herein is that the same processes designed to work in batch mode can be encapsulated in web services for on-demand row-at-a-time processing data in the real-time mode.

While certain examples have been used to disclose and illustrate one or more embodiments of the invention, including the best mode, and also to enable any person skilled in the art to make and use the invention, it is important to realize that these are merely examples.

It is further noted that the systems and methods disclosed herein may be implemented on various types of computer architectures, such as for example on a single general purpose computer or workstation, or on a network (e.g., local area network, wide area network, or internet), or in a client-server configuration, or in an application service provider configuration. Also, the system's and method's data (such as hierarchical dimensional data) may be stored as one or more data structures in computer memory and/or storage depending upon the application at hand. The systems and methods may be provided on many different types of computer readable media including instructions being executable by a computer to perform the system and method operations described herein. The systems and methods may also have their information transmitted via data signals embodied on carrier signals (e.g., radio frequency carrier signals) or other communication pathways (e.g., fiber optics, infrared, etc.).

The computer components, software modules, functions and data structures described herein may be connected directly or indirectly to each other in order to allow the flow of data needed for their operations. It is also noted that a module includes but is not limited to a unit of code that performs a software operation, and can be implemented for example as a subroutine unit of code, or as a software function unit of code, or as an object (as in an object-oriented paradigm), or as an applet, or in a computer script language, or as another type of computer code. The computer components may be located on a single computer or distributed across multiple computers depending upon the situation at hand.

We claim:

1. A method of managing data assets in an enterprise computing environment having a plurality of source systems storing a plurality of data assets, comprising:
    transmitting, using one or more computer processors, a registration request from a source system to an asset repository hub including a master reference schema, the registration request including a reference to a data asset within the enterprise computing environment;
    receiving the registration request at the asset repository hub;
    using the received registration request to obtain the referenced data asset;
    cleansing the referenced data asset against a set of business rules;
    applying one or more matching algorithms to the cleansed referenced data asset to generate one or more match codes, wherein each matching algorithm includes a set of parameters, and wherein each generated match code includes string data configured for imprecise matching within the master reference schema, such that a plurality of match codes can be matched to a single data asset; and
    clustering the generated one or more match codes against clusters of previously generated match codes to determine whether the cleansed referenced data asset is unique to the enterprise computing environment, wherein when the cleansed referenced data asset is unique, the cleansed referenced data asset is assigned a unique enterprise identifier and stored at the asset repository hub.

2. The method of claim 1, wherein when the data asset is not unique to the enterprise computing environment, checking the contents of the data asset against an enterprise version of the data asset stored in the asset repository hub to determine if the data asset includes additional data to the enterprise version; and
    when the data asset includes additional data, determining whether to add the additional data to the enterprise version stored at the asset repository.

3. The method of claim 1, further comprising:
    validating the data asset against a set of validation rules; and when the data asset does not meet the set of validation rules, denying the registration request.

4. The method of claim 1, wherein transmitting comprises:
    transmitting a web service call from the source system to the asset repository hub, the asset repository hub providing a web service interface for receiving registration requests over a network connection.

5. The method of claim 1, wherein cleansing further comprises:
    comparing the form and content of data attributes of the data asset against the set of business rules; and
    transforming the data attributes to be compatible with the set of business rules.

6. The method of claim 1, wherein generating the one or more match codes further comprises:
    associating one or more match definitions with string data from the data asset; and
    for each match definition, parsing the string data into a plurality of tokens.

7. The method of claim 6, further comprising:
    associating a token value for each of the plurality of tokens.

8. The method of claim 7, further comprising:
    determining which of the tokens are significant; and selecting the most significant tokens for further processing.

9. The method of claim 8, further comprising:
    generating one or more match values based upon the most significant token values; and encoding the one or more match values to form the one or more match codes that describe the content of the data asset.

10. The method of claim 9, wherein generating one or more match values further comprises:
    normalizing the significant tokens by transforming the significant token values against a set of normalization rules;
    identifying and eliminating any statistically insignificant token values from the normalized significant tokens;
    standardizing the significant tokens by transforming the significant token values against one or more standardization definitions; and
    phonetically reducing the significant token values.

11. The method of claim 9, further comprising:
    concatenating one or more of the one or more match values prior to forming the one or more match codes.

12. The method of claim 9, wherein the one or more match codes are generated using portions of the one or more match values, and wherein a portion of a match value can include the entire match value.

13. The method of claim 12, wherein the amount of the portions of the match values used to generate the one or more match codes is responsive to a match code sensitivity setting.

14. The method of claim 13, wherein when the match code sensitivity setting is set to a relatively high value, greater portions of each of the match values are used to generate the one or more match codes.

15. The method of claim 1, further comprising:
storing location information along with the referenced data asset, the location information indicating the source system where the referenced data asset is stored.

16. The method of claim 1, wherein the clustering step further comprises:
determining whether the generated one or more match codes are distinct from the clusters of previously generated match codes; and
when the generated one or more match codes are distinct, assigning a unique cluster ID to the generated one or more match codes, the unique cluster ID indicating that the data asset is unique to the enterprise computing environment.

17. The method of claim 16, wherein determining further comprises:
loading a cluster state file into memory comprising the clusters of previously generated match codes and one or more previously generated cluster IDs associated with the previously generated match codes; and
hashing the generated one or more match codes into the cluster state file.

18. The method of claim 17, further comprising:
determining if the generated one or more match codes are already stored in the cluster state file, and when the generated one or more match codes are already stored in the cluster state file, associating the cluster ID of the previously generated match codes with the data asset that generated the one or more match codes.

19. The method of claim 18, further comprising:
analyzing the cluster state file to determine whether a generated match code is stored in more than one location in the cluster state file, and when the generated match code is stored in more than one location, associating a lowest cluster ID with the generated match code.

20. The method of claim 19, further comprising:
determining whether the hashing results in overlapping cluster IDs within the cluster state file, and when the hashing results in overlapping cluster IDs within the cluster state file, minimizing the number of unique cluster IDs maintained in the file by collapsing the cluster state file.

21. The method of claim 1, further comprising:
transmitting a search request, including an asset description search criteria, from another source system to the asset repository hub, the search request seeking to locate a data asset within the enterprise computing environment;
receiving the search request at the asset repository hub;
cleansing the asset description search criteria provided along with the search request;
generating one or more match codes based upon the asset description search criteria that describe the data asset being searched for; and
clustering the generated one or more match codes against clusters of previously generated match codes to determine whether the data asset being searched for is registered within the enterprise computing environment; and when the data asset is registered within the enterprise computing environment, transmitting the data asset information back to the source system generating the search request.

22. A method of managing data assets in an enterprise computing environment having a plurality of source systems storing a plurality of data assets, comprising:
receiving, using one or more computer processors, a registration request at an asset repository hub including a master reference schema, the registration request including a reference to a data asset within the enterprise computing environment;
using the received registration request to obtain the referenced data asset;
cleansing the referenced data asset against a set of business rules;
applying one or more matching algorithms to the cleansed referenced data asset to generate one or more match codes, wherein each matching algorithm includes a set of parameters, and wherein each generated match code includes string data configured for imprecise matching within the master reference schema, such that a plurality of match codes can be matched to a single data asset; and
clustering the generated one or more match codes against clusters of previously generated match codes to determine whether the cleansed referenced data asset is unique to the enterprise computing environment;
determining that the cleansed referenced data asset is unique; and
assigning the cleansed referenced data asset a unique enterprise identifier and storing the cleansed referenced data asset at the asset repository hub.

23. A system, comprising:
one or more processors;
one or more computer-readable storage mediums containing software instructions executable on the one or more processors to cause the one or more processors to perform operations including:
receiving, using one or more computer processors, a registration request at an asset repository hub including a master reference schema, the registration request including a reference to a data asset within the enterprise computing environment;
using the received registration request to obtain the referenced data asset;
cleansing the referenced data asset against a set of business rules;
applying one or more matching algorithms to the cleansed referenced data asset to generate one or more match codes, wherein each matching algorithm includes a set of parameters, and wherein each generated match code includes string data configured for imprecise matching within the master reference schema, such that a plurality of match codes can be matched to a single data asset; and
clustering the generated one or more match codes against clusters of previously generated match codes to determine whether the cleansed referenced data asset is unique to the enterprise computing environment;
determining that the cleansed referenced data asset is unique; and
assigning the cleansed referenced data asset a unique enterprise identifier and storing the cleansed referenced data asset at the asset repository hub.

* * * * *

UNITED STATES PATENT AND TRADEMARK OFFICE
CERTIFICATE OF CORRECTION

| | | |
|---|---|---|
| PATENT NO. | : 7,747,480 B1 | |
| APPLICATION NO. | : 11/692433 | |
| DATED | : June 29, 2010 | |
| INVENTOR(S) | : Agresta et al. | |

It is certified that error appears in the above-identified patent and that said Letters Patent is hereby corrected as shown below:

In column 7, line 28, delete "MYLY$$M@/m$$$$" and insert -- MYLY$$M@M$$$$$ --.

Signed and Sealed this
Twenty-first Day of June, 2011

David J. Kappos
*Director of the United States Patent and Trademark Office*